United States Patent
Borrel et al.

(10) Patent No.: US 10,592,743 B2
(45) Date of Patent: Mar. 17, 2020

(54) MACHINE LEARNING TO PREDICT COGNITIVE IMAGE COMPOSITION

(71) Applicant: International Business Machines Corporation, Armonk, NY (US)

(72) Inventors: Paul Borrel, New York, NY (US); Alvaro B. Buoro, Rio de Janeiro (BR); Ruberth A. A. Barros, Rio de Janeiro (BR); Daniel Salles Chevitarese, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 15/685,016

(22) Filed: Aug. 24, 2017

(65) Prior Publication Data

US 2019/0065848 A1    Feb. 28, 2019

(51) Int. Cl.
| | |
|---|---|
| *G06K 9/00* | (2006.01) |
| *G06T 7/00* | (2017.01) |
| *G06N 3/00* | (2006.01) |
| *G06N 20/00* | (2019.01) |
| *G06T 11/00* | (2006.01) |

(Continued)

(52) U.S. Cl.
CPC ..... *G06K 9/00624* (2013.01); *G06K 9/00201* (2013.01); *G06K 9/00671* (2013.01); *G06K 9/6289* (2013.01); *G06N 3/006* (2013.01); *G06N 20/00* (2019.01); *G06T 7/97* (2017.01); *G06T 11/00* (2013.01); *G06K 9/32* (2013.01)

(58) Field of Classification Search
None
See application file for complete search history.

(56) References Cited

U.S. PATENT DOCUMENTS

| | | |
|---|---|---|
| 7,356,174 B2 | 4/2008 | Leue et al. |
| 7,889,210 B2 | 2/2011 | Borrel et al. |

(Continued)

FOREIGN PATENT DOCUMENTS

| | | |
|---|---|---|
| WO | 2012/085765 A2 | 6/2012 |
| WO | 2016/063235 A2 | 4/2016 |

OTHER PUBLICATIONS

Ma, Kwan-Liu. "Machine learning to boost the next generation of visualization technology." IEEE Computer Graphics and Applications 27.5 (2007): 6-9. (Year: 2007).*

(Continued)

*Primary Examiner* — Vu Le
*Assistant Examiner* — Tracy Mangialaschi
(74) *Attorney, Agent, or Firm* — Scully, Scott, Murphy & Presser, P.C.; Joseph Petrokaitis

(57) ABSTRACT

An automatic method of determining an image composition procedure that generates a new image visualization based on aggregations and variations of input images. A set of input images is received. Visual features are extracted from the input images. Context associated with input images is received. Based on the extracted visual features and the context associated with the input images, a composition procedure comprising a set of image operations to apply on the set of input images is learned. One or more image operations in the composition procedure are determined to present to a user. A difference visualization image associated with the input images may be generated by executing the one or more image operations.

20 Claims, 10 Drawing Sheets

(51) Int. Cl.
*G06K 9/62* (2006.01)
*G06K 9/32* (2006.01)

(56) References Cited

U.S. PATENT DOCUMENTS

| | | | |
|---|---|---|---|
| 8,693,752 B2 | 4/2014 | Lundstrom | |
| 2009/0327883 A1* | 12/2009 | Robertson | G06F 16/44 715/273 |
| 2013/0265319 A1 | 10/2013 | Fisher et al. | |
| 2016/0048982 A1 | 2/2016 | Dhanantwari et al. | |
| 2017/0262598 A1* | 9/2017 | Petkov | G06T 15/08 |

OTHER PUBLICATIONS

Aragon, Cecilia R., and Karl J. Runge. "Workflow management for high volume supernova search." Proceedings of the 2009 ACM symposium on Applied Computing. ACM, 2009. (Year: 2009).*

Schmidt, Johanna, M. Eduard Gröller, and Stefan Bruckner. "VAICo: Visual analysis for image comparison." IEEE transactions on visualization and computer graphics 19.12 (2013): 2090-2099, (Year: 2013).*

Donahue, Jeff, et al. "Decaf: A deep convolutional activation feature for generic visual recognition." International conference on machine learning. 2014. (Year: 2014).*

Tzeng, F-Y., Eric B. Lum, and K-L. Ma. "An intelligent system approach to higher-dimensional classification of volume data." IEEE Transactions on visualization and computer graphics 11.3 (2005): 273-284. (Year: 2005).*

Schultz, Thomas, and Gordon L. Kindlmann. "Open-box spectral clustering: applications to medical image analysis." IEEE Transactions on Visualization and Computer Graphics 19.12 (2013): 2100-2108. (Year: 2013).*

Cryer, J., et al., "Resemble.js : Image analysis and comparison", https://huddle.github.io/Resemble.js/, Printed on Aug. 22, 2017, 2 pages.

Imagemagick Studio LLC, "Command-line Tools: Compare @ IamgeMagick", http://www.imagemagick.org/script/compare.php, Printed on Aug. 22, 2017, 3 pages.

Raymond, "5 Ways to Compare the Difference Between Two Identical Looking Images", https://www.raymond.cc/blog/how-to-compare-the-difference-between-two-identical-looking-images/, Updated Dec. 2016, Printed on Aug. 22, 2017, 10 pages.

OCSI, "Case study: Visualising uncertainty", Dataviz, Improving Data Visualization for the Public Sector, http://www.improving-visualisation.org/case-studies/id=3, Printed on Aug. 22, 2017, 4 pages.

Correll, M., et al., "Error Bars Considered Harmful:Exploring Alternate Encodings for Mean and Error", Authors preprint version to appear in IEEE Transactions on Visualization and Computer Graphics, Dec. 2014, 10 pages.

Brodlie, K., et al., "Chapter 6: A Review of Uncertainty in Data Visualization", Expanding the Frontiers of Visual Analytics and Visualization, Apr. 2012, pp. 81-109.

Stamen Design, "MSNBC hurricane maps are live", http://content.stamen.com/msnbc_hurricane_maps_are_live, Aug 30, 2008, Printed on Aug. 23, 2017, 3 pages.

Spiegelhalter, D., et al., "Visualizing Uncertainty About the Future", Science, Sep. 9, 2011, pp. 1393-1400, vol. 333.

Bonneau, G.P., et al., "Chapter 1: Overview and State-of-the-Art of Uncertainty Visualization", Scientific Visualization, Mathematics and Visualization, Jan. 2014, pp. 3-27.

* cited by examiner

MACHINE LEARNING TO PREDICT COGNITIVE IMAGE COMPOSITION

FIELD

The present application relates generally to computers and computer applications, and more particularly to image visualizations and machine learning to automatically predict image processing procedures that generate desired difference visualization in images.

BACKGROUND

In many processes, insight can be obtained by comparing images that represent the same physical environment or the same phenomena, taken or created under various circumstances. For example, visualizing the uncertainty associated with the output of computer applications is critical in many industries. Visualizing uncertainty can be accomplished through the modification (or annotation) of the images generated by uncertainty-agnostic applications. This principle applies in a situation where the effect of the uncertainty on the images generated by the applications is not predictable. In this case, uncertainty visualization can be achieved by creating an image that results from the composition of a set of realizations, i.e., the images of the result generated by the application for varying values of (an) uncertain parameter(s) or (an) uncertain input data element(s).

As another example, evolution through time of physical phenomena is important in industries such as agriculture, where the variation in time of size and color of crop indicates information about its health. One can then envision a computer application that performs the comparison of images of the crop taken at various times. This comparison can in turn lead to the building of new images, composed from the initial ones that highlight the differences.

As yet another example, comparing a manufactured product with its specification allows identifying manufacturing defects, for example, impurity detection, geometry feature (straightness, curvature, parallelism) verification, abnormal texture area detection and color, brightness feature verification. This can be achieved by comparing and composing images of the "as designed" product—possibly created using a 3D virtual model—and images of the final "as built" product. Still yet, in medical imaging, medical imagery informs doctors of the evolution of diseases through the comparison of, for example, an anomaly such as a tumor through time.

While existing computer vision, histogram methods, and other image processing approaches may analyze and highlight differences among images, no systematic methods exist currently that capture the description of the composition, the image comparison procedure itself. A composition is therefore not easily reproducible, as it cannot be documented, it cannot be taught, and it cannot be automatically re-applied from one problem to the next.

BRIEF SUMMARY

An automatic method and system of determining an image composition procedure that generates a new image visualization based on aggregations and variations of input images are provided. The method may be executed by a hardware processor, and may include receiving a set of input images. The method may also include extracting visual features from the input images. The method may further include receiving context associated with input images. The method may include also learning based on the extracted visual features and the context associated with the input images, a composition procedure comprising a set of image operations to apply on the set of input images. The method may further include determining one or more image operations in the composition procedure to present to a user. The method may also include generating a difference visualization image associated with the input images by executing the one or more image operations.

An automatic system of determining an image composition procedure that generates a new image visualization based on aggregations and variations of input images, in one aspect, may include at least one hardware processor and a display device coupled to the at least one hardware processor. The at least one hardware processor may be operable to receiving a set of input images. The at least one hardware processor may be operable to extract visual features from the input images. The at least one hardware processor may be operable to receive context associated with input images. The at least one hardware processor may be operable to learn based on the extracted visual features and the context associated with the input images, a composition procedure comprising a set of image operations to apply on the set of input images. The at least one hardware processor may be operable to determine one or more image operations in the composition procedure to present to a user on the display device. The at least one hardware processor may be operable to generate a difference visualization image associated with the input images by executing the one or more image operations.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system and method may be provided that capture systematic procedures for creating a description of composition of image differences. In one embodiment, no a priori knowledge of the underlying physical environment or phenomena associated with images is assumed, and insight is obtained through the creation and analysis of images that represent the differences among images of the physical environment or phenomena. The system and method in one embodiment provides a systematic approach to creating a representation of the image comparison procedure, so as to allow for editing, storing, documenting, reapplying, and intelligently selecting the comparison procedure for a given problem.

Machine learning algorithms may be implemented to learn comparison procedures to employ in a given set of images, for example, based on historical uses of those comparison procedures. In the following description, the process of comparing images by executing a plurality of comparison procedures or operations is described. Such usage of the comparison procedures are input to a machine learning algorithm to learn (or train a machine) to be able to predict what set of comparison procedures to apply to what set of images to create a desired difference visualization result.

Figure 1A:
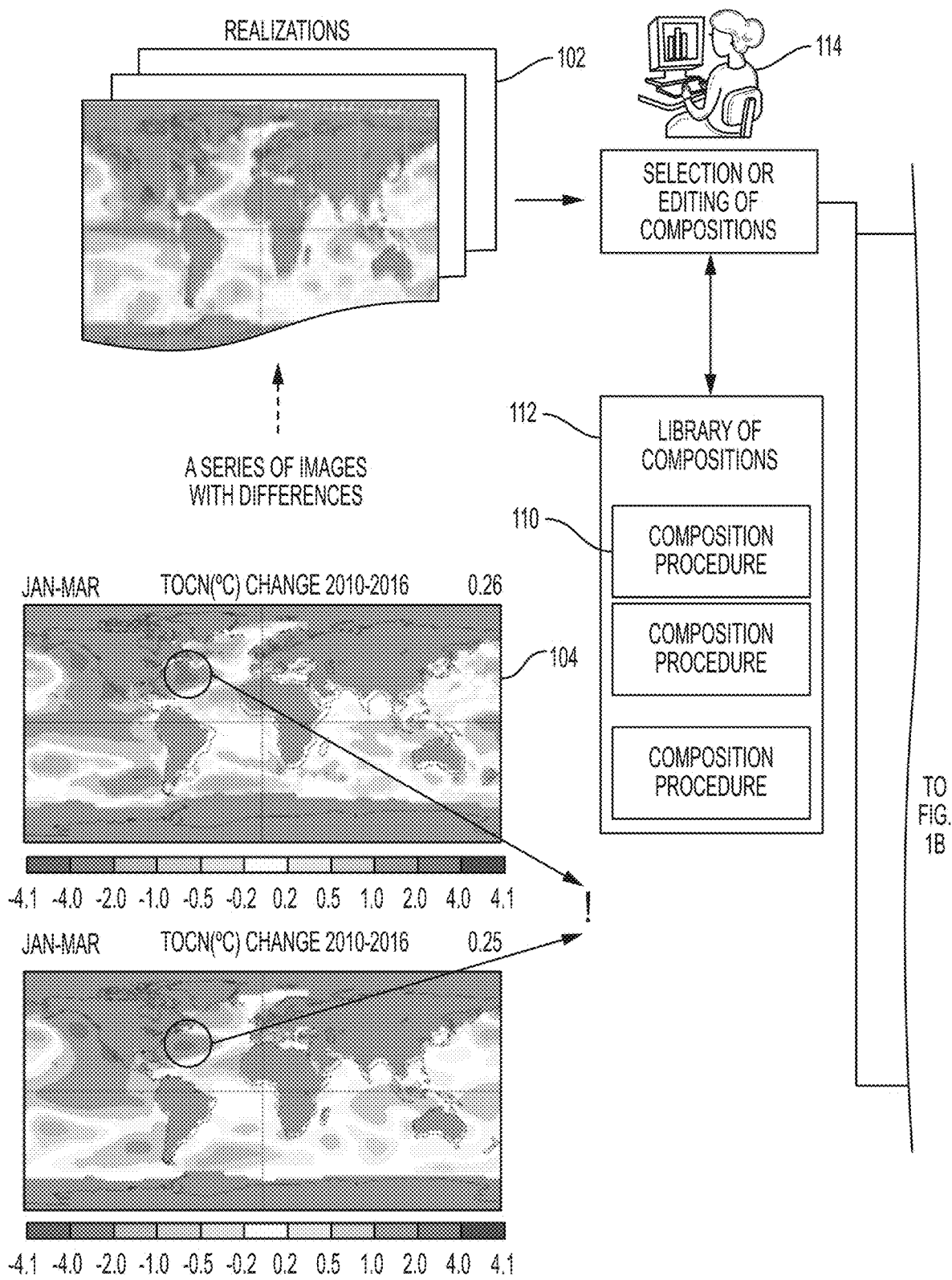
FIG. 1A and FIG. 1B are diagrams illustrating a composition process in one embodiment of the present disclosure.
Figure 1B:
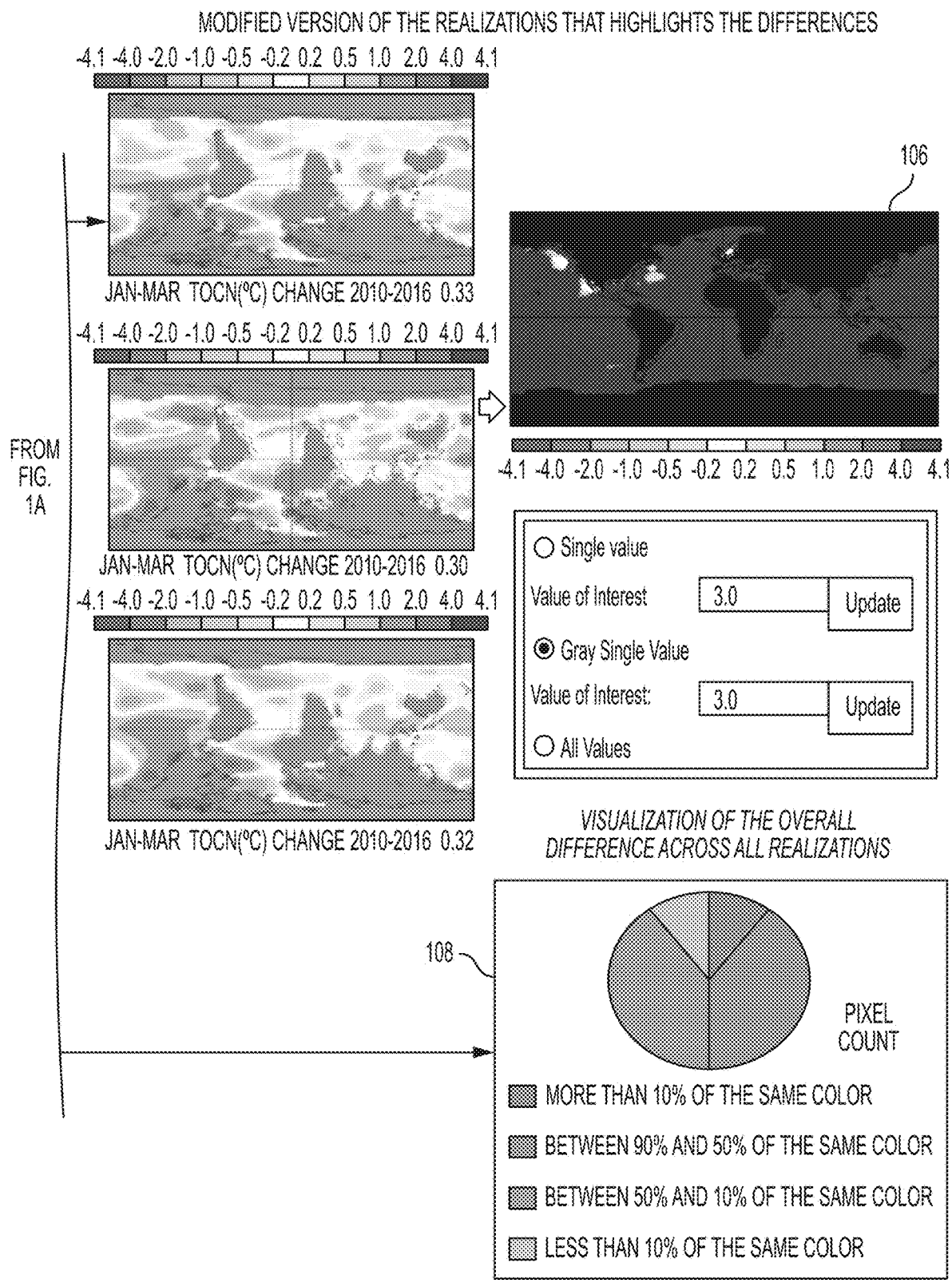

Comparing the images in one embodiment may be achieved through a composition procedure that can create multiple classes of output. Once the images have been compared, additional images are created to represent the differences. FIG. 1A and FIG. 1B show a diagram illustrating a composition process in one embodiment.

Realizations 102 refer to the original images that represent the same object, (e.g., data, environment, or phenomena). In one aspect, the realizations may only differ by the colors of specific pixels. These pictures or images can be the representations of results of the same calculations performed by the applications for different values of parameters. For example, the application that provides the images may run several simulations, for example, with different values for the simulation parameters. Each run can generate a different image representing the phenomena. Those images are the input to a methodology and/or system of the present disclosure. The realizations can also be photos of the same physical environment taken at different times. The realizations 102 of an object can include different images of that same object as shown at 104.

In the present disclosure, composition refers to the process by which realizations are accessed, compared, and combined to create one or several images that depict the insight derived from the comparison. A machine learning technique in one embodiment of the present disclosure learns the compositions applied to images and generates desired results. Given a set of images (or realizations), the trained machine may predict a composition (set of comparison operations) to execute on the given set of images (realizations) that generates the desired resulting difference visualization.

Consider the following simple example. Assume that one or several applications plot a map of the world, with different colors associated with temperatures. For example, hot regions are represented in red, while colder regions are represented in blue. Further assume that there exist several sources of data that give the temperatures of the regions. Each realization may then correspond to one image created using one data source. Comparing all the realizations created for all the data sources allow identifying regions where all sources of data agree on the temperatures, and regions where they do not agree, and thus for example, where the temperature is uncertain. Additional images are then created to plot the map of the world, highlighting regions where all data sources agree on the temperature (for example, color coded, for example, in black) and regions where they do not agree on the temperature (for example, in a color that depends on the span of temperatures across the data sources).

Depending on the domain, there can be an arbitrary number of realizations. The realizations may be created using a domain dependent context, such as the software application(s) that is (are) used to create them, the semantic of the varying key performance indicators (KPIs) that are being plotted (the temperature in this particular example), or the legend of the drawing (for example, a color scale to map temperature to color). Briefly, a legend in a drawing or image shows a key of mappings, for example, that explains the symbols or colors (or others) that are used on the image describing what they mean.

There may be two basic classes of compositions: compositions that create a modified version of realizations 106; and compositions that create a visualization of the overall difference across all realizations 108.

In compositions that create a modified version of realizations 106, the composition includes in creating images that represent the same data or phenomena as the realizations, but modified to highlight the insight gained from the comparison. For example, in a medical imaging use case, the composition may represent a body area of a patient where the regions of interest (for example, those regions that show an evolution from one exam to the next) are represented with a specific color to call the attention of the medical staff.

The following list shows example compositions of that class (compositions that create a modified version of realizations):

Show all areas of the pictures where one color (or one range of colors) occurs, with a degree of certainty (frequency of the occurrence of the color in all realizations) represented through another color scale that represents the nature of the insight (e.g., a grey scale).

Keep the original colors at each pixel, only if the color is present in all the realizations at the corresponding pixel (or a pre-defined proportion of the realizations, e.g., above 90%). The pixels where the proportion is below the threshold are represented in black, or another pre-defined color.

Show only the pixels where there is a difference, for example, all the pixels that do not have the same color in all realizations. The color chosen for these pixels can be the mapping of the uncertainty (e.g., the distribution of colors at the pixel) to another color scale (e.g., grey scale).

Average (or another like statistical computation) the colors at each pixel across all realizations.

Create a video by animating the color at each pixel so as to represent all realizations.

The compositions that create a visualization of the overall difference across all realizations 208 may be seen as the dual to the above techniques, where after the differences among the realizations have been identified, visualization (another image) is created based only on the analysis of the differences. The system in one embodiment may discretize color values, make a count of colors (after discretization) and represent this count as a pie-chart, or a histogram, or any traditional or other information visualization approach. The system in one embodiment may make a count of differences globally across all pixels and all realizations. The result, once represented through a pie-chart or equivalent representation can be used to represent the overall "similarity" of the whole set of realizations. For example, if there is no difference among the realizations, a 100% certainty of color will have a very high count. Conversely, if no pixel is of the same color for all the realizations, then there is no "fully certain" count.

A composition procedure 110 is a succession of elementary operations, for example, computer executable instructions, performed on the realizations 102. A library 112 of compositions may store composition procedures. The system in one embodiment provides a set of suggestions of composition procedures (that produce the final result visualization) to the user based on context information. For example, while the user is composing his/her visualization, the system may suggest an operation to aid the user. In this way, the user can edit one or more steps of the procedure to achieve a better visualization for his goals. One or more of these operations may be interactive (e.g., using user input). One or more of the composition procedures may be entirely automatic. In one aspect, an input may be provided by a user in composition. For instance, a set of realizations (images) may be input or accessed to start the composition procedure. A sequence of operations is performed until the final visualization is created and provided to the user, for example, generated and visualized on a graphical user interface display. Those operations obey a sequential structure, each operation creating data for the next ones.

Starting with a set of realizations, the user is enabled or allowed to select the legend region in an image while a normalization in the set of images is performed (if needed). The user is also enabled or allowed to select the data space that will be used. The system of the present disclosure may then detect automatically the region of interest, or the user may directly select the region of interest. These first operations are responsible for the pre-processing step providing the basic units of data needed at the next steps.

After pre-processing, image analysis is performed on the set of realizations by image comparison techniques and statistical analysis based on the information obtained previously. These operations result in the final image for visualization. In one aspect, the user 114 may be involved in almost all operations (except the automatic ones) in an interactive way, for example, setting parameters and changing color scales.

Figure 2:
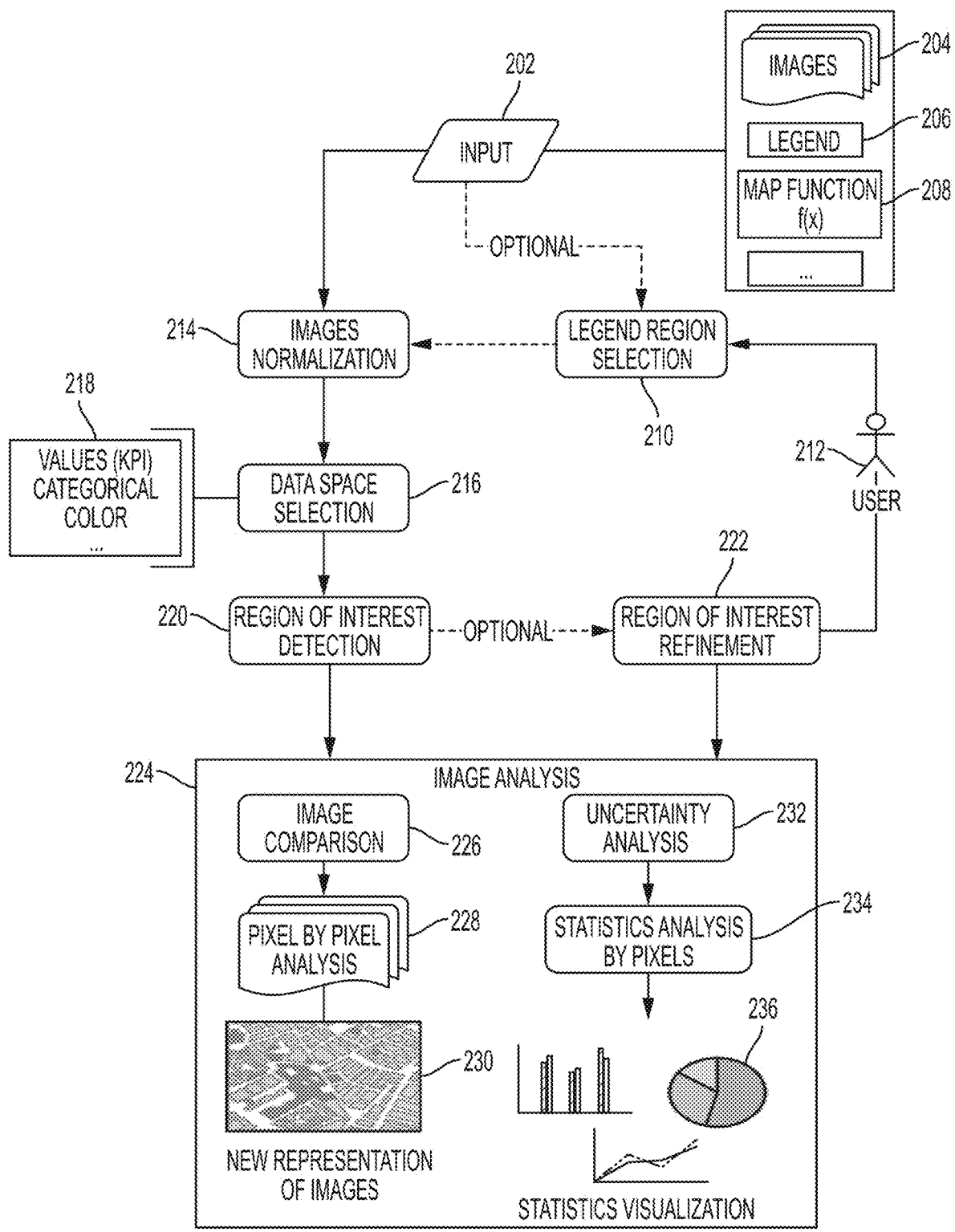
FIG. 2 is a diagram showing an application flow implementing a method in one embodiment of the present disclosure.
Figure 3:
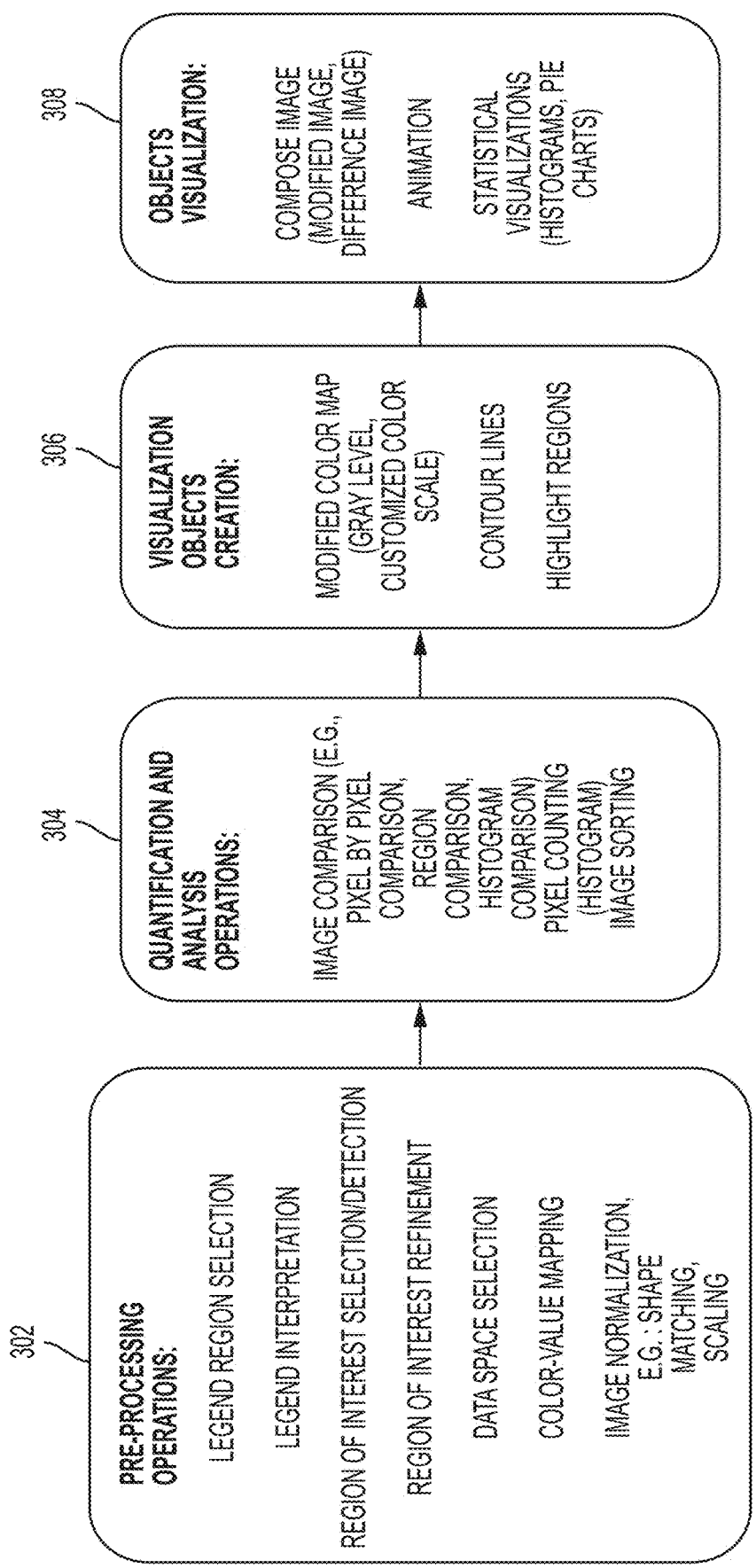
FIG. 3 is a diagram showing a sequence of a composition procedure in one embodiment of the present disclosure.

Each step in an application flow shown in FIG. 2 may be considered as an operation or set of operations that receive a set of parameters as input and returns an output. These sets of parameters may be output from the previous executed operations in a sequential way. This sequential structure is divided into four groups as illustrated in FIG. 3. A composition procedure is a sequence of parameterized operations. A composition can be edited, archived, stored, and re-executed on multiple sets of realizations. FIG. 3 is a diagram showing a sequence of a composition procedure in one embodiment of the present disclosure. The operations are executed to generate visualization. Pre-processing operations 302 include initial operations that are executed to achieve the state needed to continue the application flow. The operations may include legend region selection; legend interpretation; region of interest selection and/or detection; region of interest refinement; data space selection; color-value mapping; image normalization including shape matching and scaling.

Quantification and analysis operations 304 include operations that provide numerical data after image analysis for further generation of visualization objects. Those operations may include image comparison; pixel by pixel comparison; region comparison; histogram comparison; pixel counting (histogram); and image sorting.

Visualization objects creation 306 includes operations that generate objects that will be integrated in the final visualization(s). These operations may include modified color map; gray level; customized color scale; contour lines; highlight regions.

Objects visualization 308 includes operations that generate the proper visualization depending on the objects created previously. These operations may include compose image; modified image; difference image; animation; statistical visualizations; histograms; and pie charts. Other operations may be included.

Functional descriptions of the above operations are described below.

Legend region selection operation determines the legend information in images that are to be visualized. If information about the legend is not presented in the images, the system in one embodiment of the present disclosure may prompt the user to enter via a user interface the legend information the system or software application of the present disclosure. For instance, a range of values from minimum to maximum and its respective color scale, and categorical information about the colors (blue=low, red=high, green=intermediate) may be determined automatically by reading the image information, or provided by the user. The user may also select the legend area if the legend is part of the image, and insert the values or intervals for each color. However, the system may detect the legend area automatically.

Legend interpretation operation receives the legend image region and associates each color in the image with its correspondent value given by user or detected automatically.

Region of interest selection/detection operation is executed to allow the user to select the region of the image to be processed. This operation may also detect automatically the region of interest, for instance, if the user does not input or select the region. For instance, this region can be detected by a series of techniques. For example, the system can capture automatically areas of the image that have more variation and suggest those areas to the user. The system thus provides an option to the user to decide whether he would like to proceed the analysis in those areas, or pick selective parts in those areas to continue the process.

Region of interest refinement operation allows a user to refine the region of interest detected previously by the system of the present disclosure.

Data space selection operation defines the data space that the system will analyze. Depending on the information provided in the information acquisition component, the following scenarios are possible: The system or software application of the present disclosure knows the values represented by the colors (e.g., data space=the values (KPI)); The system or software application only knows a high level representation (categories) of the values (e.g.: blue=low, green=intermediate, red=high), in which case data space=categorical classes; The system or software application has no information about the values (data space=color space).

Color-value mapping operation, after interpretation of the legend, creates a map to associate each color to a value depending on the data space selected for further query.

Image normalization operation normalizes the image data. While the set of images represents the same data (e.g., phenomena), the images could have been generated from different software or imaging applications. This could result in realizations that have different dimensions and scale. The composition procedure in one embodiment of the present disclosure can take the set of images and normalize them according to a parameter, for example: the boundary of the larger or smaller image. For instance, the image normalization operation may perform shape matching. In shape matching, if the region of interest is a specific region in a map and the images provided have this region with different scales, shape matching operation identifies and aligns these areas. The image normalization operation may also perform scaling. For example, if needed, the images can be scaled to a default scale for further analysis.

Image comparison operation compares each image of the realizations set and generates a new representation of the data presented in these images. This can be accomplished by generating a new image or several images with a new color scale to represent and highlight the new information obtained by previous operations. The comparison among the realizations can be performed using a range of techniques. Examples of image comparison operations: may include techniques such as pixel by pixel comparison that compares individual pixels or pixel values; region comparison which compares regions (e.g., selected by user, or predefined tiles) of images; histogram comparison which includes comparison based on feature histograms for each image. In histogram comparison, the distance between the histograms of an image to a reference image can be used as the metric to quantify the differences of the realizations. Another example of an image comparison technique may include superpixels comparison, which is based on superpixels algorithms. Theses algorithms group pixels into perceptually meaningful atomic regions. This provides better primitives to compute image features and reduce the complexity of subsequent image processing. Still another example of an image comparison technique may include key-points and feature matching. These operations are based on very robust and efficient algorithms (sift[2], orb[3], freak[4], . . . ) for key-point detection, description and matching. The algorithms detect points in the images with unique information (key-point) and describe its features to further matching based on, for example, Euclidean distance. In these operations the distance of all images from a reference image can be used as a metric to quantify the differences of the realizations.

Pixel counting (histogram) operation performs the creation of histograms based on the values in each pixel position for all images in the input set. For instance, if the input set has 10 images and a pixel located at (x, y) position has value v in 9 out of 10 realizations, this operation will result in a histogram with two bars at position (x, y), for example, a histogram with a higher bar (9 counts) and a lower bar (1 count). This process is repeated for each pixel. At the end this operation, a set of histograms is provided for each pixel (or superpixel) for further analysis and visualization.

Image sorting operation sorts images or defines an order of the images in order to construct visualization through animation, to show the animation in the best possible way to the user. The sorting may be based on parameters depending on the context of the animation. For instance, the user may want to see the changing animation in an area of the images based on a specific interval of values in increasing order. Here the user may provide three parameters: the region, the interval of values to be observed and the sorting type. Sorting type allows for sorting based on the type of analysis that the user specifies. For instance, the user may want to see an animation showing the regions with more variance to regions with less variance. In this example, the sorting type is "High Variance to Low Variance."

Modified color map operation performs the creation of a different color map resulting in a composed image for the final visualization. The color map is based on the user parameters and the parameters provided by previous operations. Examples of color map types may include: gray level, in which the composed image is defined by a gray level color map that represents the level of confidence, variance or standard deviation of all the realizations pixels based on the histograms or similarity measures provided by previous operations; and customized colors, which may be similar to the gray level color scale, but with predefined or user defined color scales.

Contour lines operation is a technique that visualizes areas with similar values in two dimensional (2d) or three dimensional (3d) images as elevation and depth on maps. This operation produces an image mask with the contours lines to be applied to compose the final visualization image.

Highlight region operation performs region highlighting based on user input parameters. For instance, the user may specify to visualize all regions that have level of confidence above 80%, then the system via this highlight region operation generates a visualization image with a new color map representing the interval of confidence from 80% to 100% in those regions. A user interface in the system of the present disclosure in one embodiment may allow the user to select and modify the color map to better fit the user's desired visualization needs.

Compose image operation produces the final visualization image based on the previous sequence of operations that resulted in objects used to compose the image. An example of a modified image may show a composed image with contour lines representing areas with 90% or more of confidence, for example, areas with pixels that are present in at least 90% of the realizations. A difference image may show only the pixels where there is a difference, for example, all the pixels that do not have the same color in all realizations. The color chosen for these pixels can be the mapping of the uncertainty (the distribution of colors at the pixel) to another color scale (for example, grey scale).

Animation operation may create a video by animating the color at each pixel so as to represent all realizations. The timing can start by the lower color scale tone and increase together with the difference in realization to the next level (range value) while all the rest of the colors are 90% saturated.

Statistical visualization operations provide visualizations of the differences, variations and correlation of the realizations. The statistical visualization may be based on the data that represents the difference and similarity of realizations. For instance, a traditional pie chart may be divided into slices of different colors representing numerical proportion. Suppose that there is a set of histograms where each histogram is the distribution of pixel values in a position (x, y) of all realizations. Based on these histograms a pie chart can be created representing the proportion of values in all realizations but with an intermediate color between slices that represent values that does not appear in 100% of the realizations at the same pixel. That intermediate color can represent the "uncertainty" in the realizations and the pie chart represents the overall "similarity" of all images with "uncertainty" information.

Table 1 shows the parameters input and output objects for each operation described above.

TABLE 1

| Operation | Input | Output |
| --- | --- | --- |
| Legend region selection | Image, region coordinates | Legend image |
| Legend interpretation | Image or legend image | Color-value table |
| Region of interest selection/detection | Image, region coordinates | Region of interest (ROI) Image |
| Region of interest refinement | Region of interest (Roi) image, region coordinates | Roi image |
| Data space selection | Data space type (KPI, categorical, color) | Data space object |
| Color-value mapping | Color-value table, data space object | Color-value map |
| Shape matching/scaling | Image set | Scaled/normalized image set |
| Pixel counting | Image set, color-value map | Pixel values distribution, mean, standard deviation, variance, median |
| Pixel comparison | Image set, color-value map | Similarity measures values |
| Region comparison | Image set, color-value map, region coordinates | Similarity measures values |
| Histogram comparison | Image set, color-value map, features | Similarity measures values |
| Superpixel comparison | Image set, color-value map | Similarity measures values |
| Keypoints and feature matching | Image set | Similarity measures values |
| Image sorting | Image set, histogram data, similarity measures values, color-value map, sorting parameter | Ordered image set |
| Modified color map | Histogram data, similarity measures values, color scale type | Color map |
| Contour lines | Histogram data, similarity measures values, threshold | Isoline mask |
| Highlight regions | Regions coordinates, histogram data, similarity measures values, observable parameters | Set of highlighted regions |
| Modified image | Color map, isoline, isosurface, averaged values matrix | Modified visualization |
| Difference image | Color map, set of highlighted regions | Image with regions highlighted accordingly to the specified parameters |
| Animation | Color map, ordered image set | Video animation |
| Statistical visualizations | Histogram data, standard deviation, variance, mean, median | Graphs: histogram, pie chart, other graphs |

Referring back to FIG. 2, FIG. 2 is a diagram showing an application flow, for example, the logic of a method in one embodiment of the present disclosure. Input 202 including images (realizations) 204, legend information 206 of the images (e.g., if the image does not have an embedded legend, the user can provide a high level legend, for example, red=high values, green=medium, blue=low, and so on), map function t(x) 208, and others are received or accessed. Map function t(x) 208 may be a function that maps a parameter space to a color space. E.g., a value of precipitation forecast to a pixel value (color) in the map. It is a way to represent the data in the images without knowing the data itself. Input 202 also may include legend region selection 210 selected and input by a user 212. The user may select manually the region of the image that represents the legend. The computer extracts the colors and the values associated with these colors from the legend. Based on this information, the computer can calculate the histograms with the distributions of colors/values of the images.

At 214, the images (realizations) 204 are normalized so that operations may be performed across the images consistently. At 216, data space selection is performed that defines the data space to be analyzed, for example, according to the available information about the images 218. For instance, data space may be defined according to KPI values, for example, if the application or system knows the values represented by the colors; data space may be defined according to categories of classes, for example, if the application or system only knows a high level representation or categories of values, for example, blue representing low, green representing intermediate, and red represents high; data space may be defined according to colors, for example, if the application or system has no information about specific values represented by the colors in the images.

At 220, region of interest is detected. For example, the user 212 may select a region in an image on a user interface, for example, by dragging a mouse around the region of select. The system may also automatically or autonomously detect a region of interest in an image, without user intervention or input. For instance, this region can be detected by a series of techniques. For example, the system can capture automatically areas of the image that have more variation and suggest those areas to the user. The system thus provides an option to the user to decide whether he would like to proceed the analysis in those areas, or pick selective parts in those areas to continue the process.

At 222, the region of interest may be refined. For instance, the user may further modify the boundaries of the region of interest, which may have been automatically or autonomously detected by the system. In another aspect, the user may further modify the region that the user has previously selected. For instance, instead of comparing the whole images, the user can select a part of the image to compute the differences. Once the region of interest is defined, the same region is obtained for all the realizations. Then, the operations can be applied to those sub-images.

At 224, automatic or autonomous analysis of the realizations (images) is performed to create visualization, for example, modified version of the realizations that highlights the differences and/or visualization of the overall difference across all realizations. Image comparison at 226 may compare the normalized images (e.g., the selected region of interest), for example, using techniques such as pixel by pixel analysis 228 (region comparison and histogram comparison are other examples of comparison techniques that may be employed) and generate new representation of images 230. New representation of images 230 may include modified image, difference image and animated image. Uncertainty analysis 232 compares images to determine the degree of differences in the image. Statistical analysis by pixels 234 may be performed to produce statistical visualizations 236, for example, histograms and pie charts.

For example, image comparison 226 may compare images (normalized images or realizations) to identify the pixels that have different colors in the realizations (or regions of interest in the realizations). These variations of colors represent uncertainty in the values represented in the images, for example, as may be determined in uncertainty analysis 232. The number of different colors at a given pixel may be assumed to be proportional to the amount of uncertainty at that pixel. Once this is quantified, the system can show all the colors of the images within a certain window of uncertainty, e.g., only show the pixels with the same color in all realizations (i.e., no uncertainty) or for a given range of uncertainty (e.g., between 80% and 100%), show all the colors.

Figure 4:
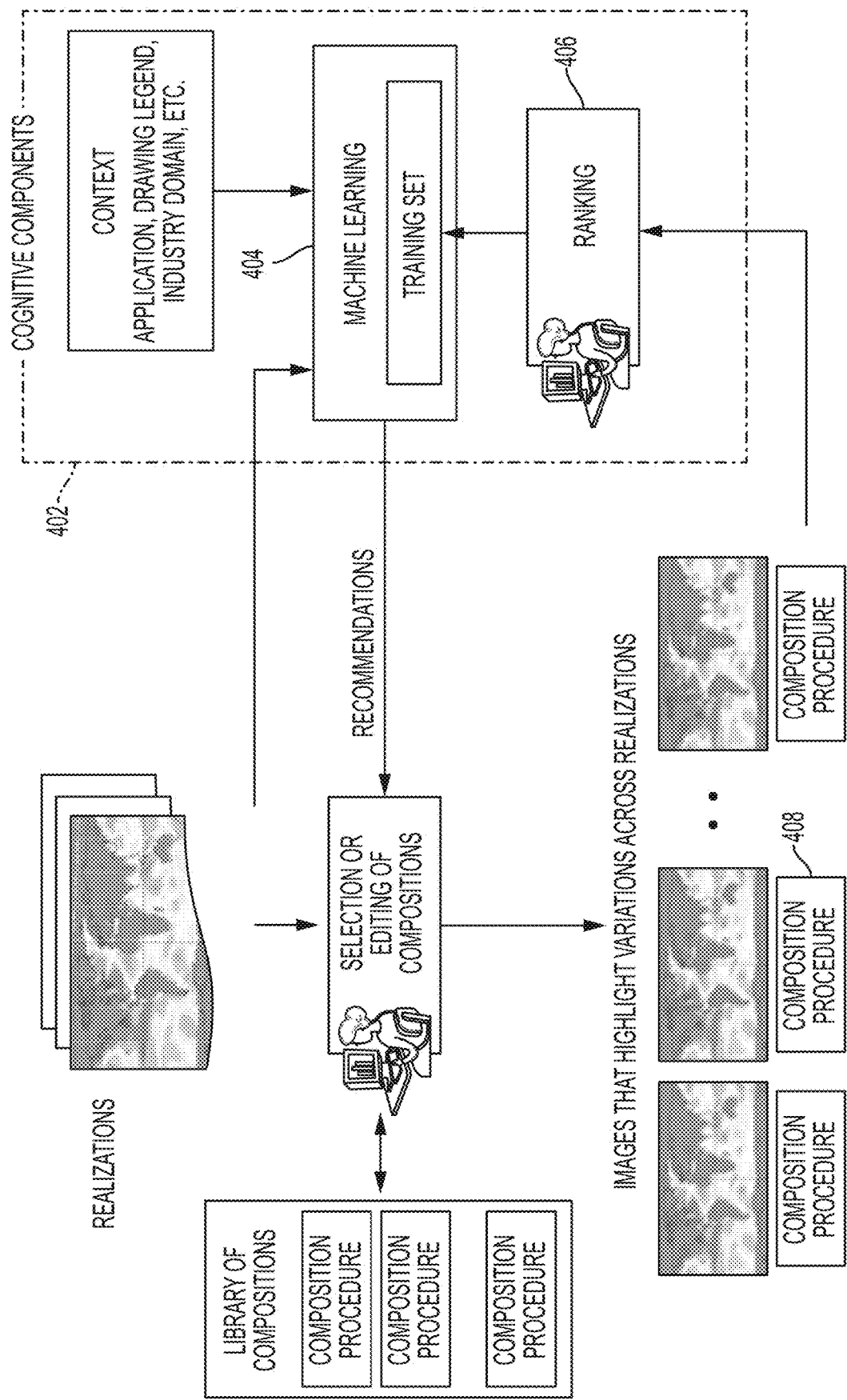
FIG. 4 is a diagram illustrating cognitive component in a visualization system in one embodiment of the present disclosure.

FIG. 4 is a diagram illustrating a cognitive component in a visualization system in one embodiment of the present disclosure. Selecting the best composition procedure for a specific problem is difficult. Deciding which one is best suited to tackle the problem at hand among many alternatives can prove very cumbersome. A cognitive component 402 that includes a machine learning algorithm 404 and learned model can help select the "best" composition procedure for a given task, based on previous utilizations of the procedure (for example, shown at 408). Such machine learning or cognitive component 402 may be provided in the present disclosure in one embodiment to help in the task, for example, by (1) remembering which compositions were successfully used for specific problems, including parameter values of the operations, (2) formally associating these compositions with a set of metrics that describe the nature of the problem, (3) evaluating the metrics for new problems, and (4) using these metrics to select which compositions have been successfully applied to similar problems in the past. The learning and recommendations apply to the procedures, which may be executed to generate images (e.g., desired images).

In one embodiment, the metrics used to classify compositions may include: an analysis of the realizations 402 that derive information such as the nature of the images, e.g., synthetic versus natural, the information being displayed (e.g., 2d map, 3d simulation), the number and size of images, the variability across realizations (e.g., degree of similarity), the number of colors used, whether or not there is a legend present on an image; and the context of the analysis, such as the industry domain (e.g., geology, medical imaging), the objectives of the analysis (e.g., uncertainty visualization, communication), the process step (e.g., initial analysis, final assessment).

During the learning phase, in order to assess how successful the various compositions were (for example, output difference visualization predicted by the trained model may be presented to the user(s)), the user(s) may be asked to rank the composition (e.g., at 406) and this ranking may be associated with the composition and its specific context. For instance, the composition procedures used in past visualizations are stored and used as a training set to train a model by executing a machine learning algorithm. The model is then run to predict best fit composition procedures for a given set of realizations for a given desired output difference visualization.

Figure 9:
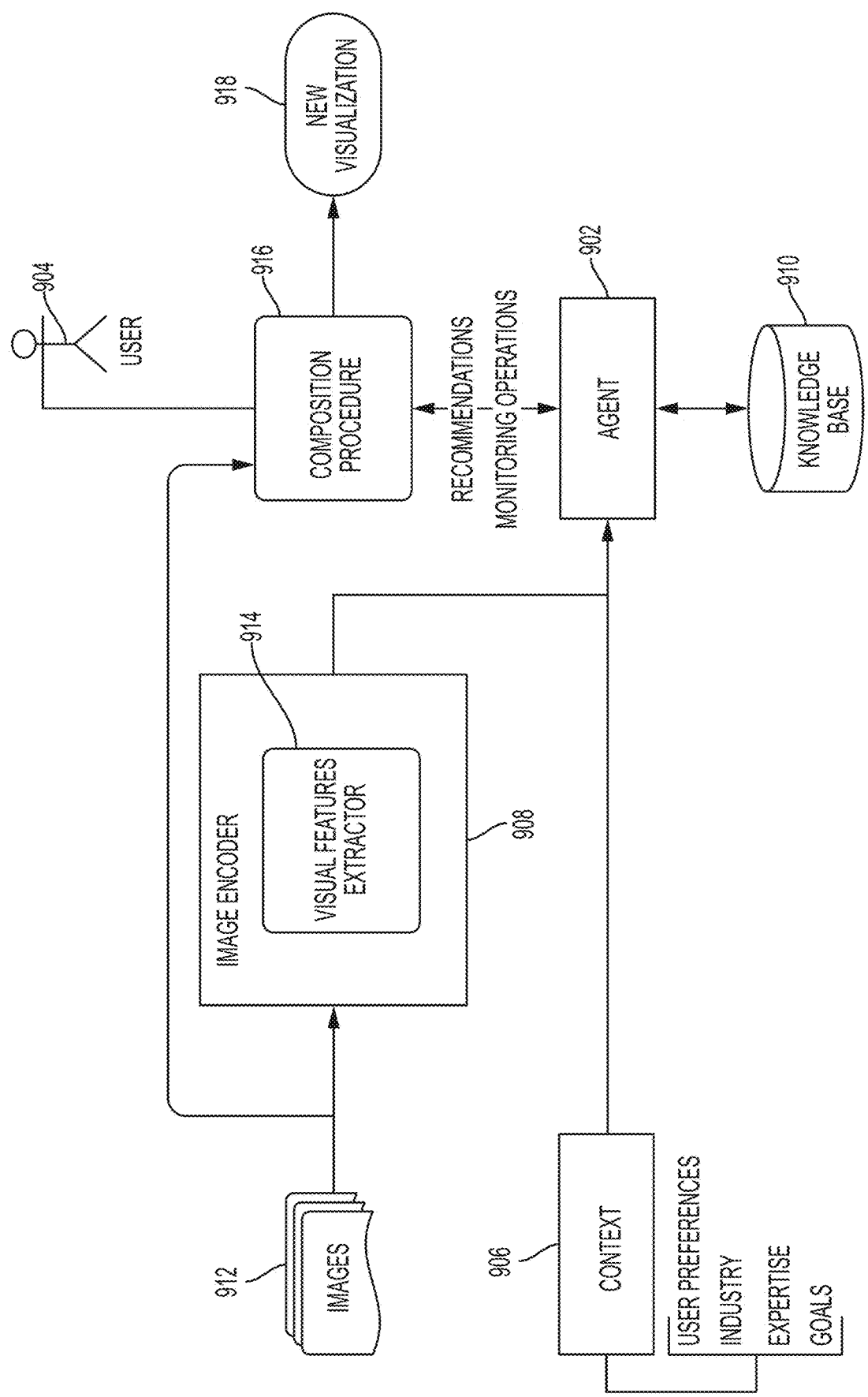
FIG. 9 is a diagram illustrating a machine learning model in one embodiment of the present disclosure.

FIG. 9 is a diagram illustrating a machine learning model in one embodiment of the present disclosure. The machine learning model in one embodiment may be based on Reinforcement Learning. The composition procedure is a sequence of operations performed by a user or suggested by the system that leads to a new visualization that highlights the variations of the input images. In FIG. 9, the agent 902 (an automated computer process) helps the user 904 select the best sequence of operations to be applied to a given input. In one embodiment, the input to the agent 902 includes the context 906, image features 908 and knowledge base 910. The context 906 represents general information about the user 904, user preferences, expertise, and objectives of the analysis. This context 906 is used as an auxiliary information to refine the learning model. Image features 908 allow the agent to understand the nature of the input images 912. This is achieved by extracting visual features that describe the images consistently. The extraction can be done using a feature extractor 914, such as, but not limited to, Deep Convolutional Activation Feature (DeCAF) described by Donahue, Jeff, et al. "DeCAF: A Deep Convolutional Activation Feature for Generic Visual Recognition." Icml. Vol. 32. 2014, to learn visual features from the set of input images 912. Knowledge base 910 is created from previous experiences and aggregated with the current execution of the composition procedure 916. Execution of the composition procedure 916 generates a new visualization 918.

Learning Model

The agent learns the best composition procedure 916 for a given context 906 and images 912. As an example, this learning process can be implemented through Reinforcement Learning, for example, described by Sutton, Richard S., and Andrew G. Barto, *Reinforcement learning: An introduction*, Vol. 1, No. 1. Cambridge: MIT press, 1998. The composition procedure is mapped to a finite state machine, where each operation of the composition is an Action that leads to a State. In the present disclosure, the State comprises the images, the image features, and the context. Each possible action, for a given state, is associated with a Reward, whose value is set through the learning procedure of Reinforcement Learning as users use the system and achieve their goals. Optionally, the user can rate his/her level of satisfaction with outcome of the composition procedure. The rating is used by the Reinforcement Learning process to improve the reward associated to the actions. As the agent has enough information it can recommend more complete composition procedures made of sequence of actions.

In one embodiment, target image sets are tested to determine which comparison technique is best, for example, by executing the learned model. The tests applied to the set of images (realizations) depend on both prior applications of compositions and the features of the current image set. These tests are learned, through a machine learning approach, from the interactions of prior users with this class of images, and from feature extracted from the images in the current state. For example, on geographical maps, the tests of comparison across realizations may be applied to areas that have high gradient in order to identify regions where some of the parameters being displayed are prone to errors, thereby identifying noise.

In one embodiment, a rule engine may be provided that help to accelerate the learning process from previous/historical compositions. For example, a rule may be defined and applied to a set of realizations where the representations of the images are compressed, and treated not one pixel at a time, but blocks of pixels at a time. In this case, the rule detects the compressed nature of the images, and enforces a processing (e.g., color comparison) based on a block of pixels.

The system may be reconfigured to compare one set versus another set of images. The reconfiguration may include in the application of a different composition procedure. The procedures are represented and stored as sequences of parameterized operations. The representation is decoded by the overall system, which is able to apply the operations appropriately.

Figure 5:
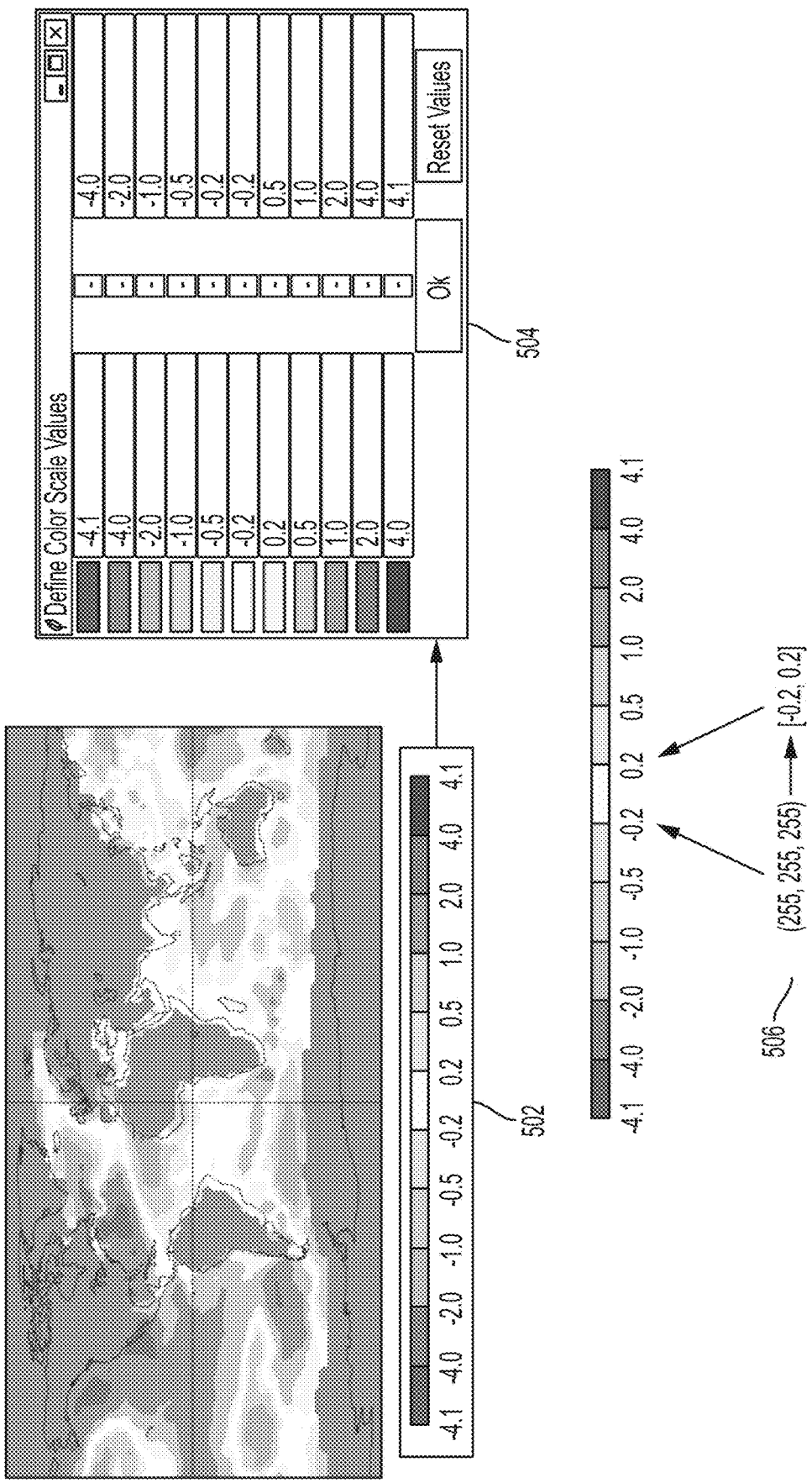
FIG. 5 is a diagram that illustrates example operations of legend region selection and legend interpretation in one embodiment of the present disclosure.

FIG. 5 is a diagram that illustrates example operations of legend region selection and legend interpretation in one embodiment of the present disclosure. A user selects the legend region, for example, shown at 502 in an image. In another aspect, the system of the present disclosure may automatically detect the legend region 502. The system automatically recognizes and associates the values with the colors as shown at 504. For instance, the system may perform image and text analysis to correlate or map the values with the colors (pixel values) in the legend. The system further analyzes the image and creates a map of colors associated with values as shown at 506: e.g., (R, G, B)→[min, max]. An example mapping may be (255, 255, 255)->[−0.2, 0.2], representing that values −0.2 to 0.2 are represented by RGB (red green blue) color space values of 255, 255, 255.

Figure 6:
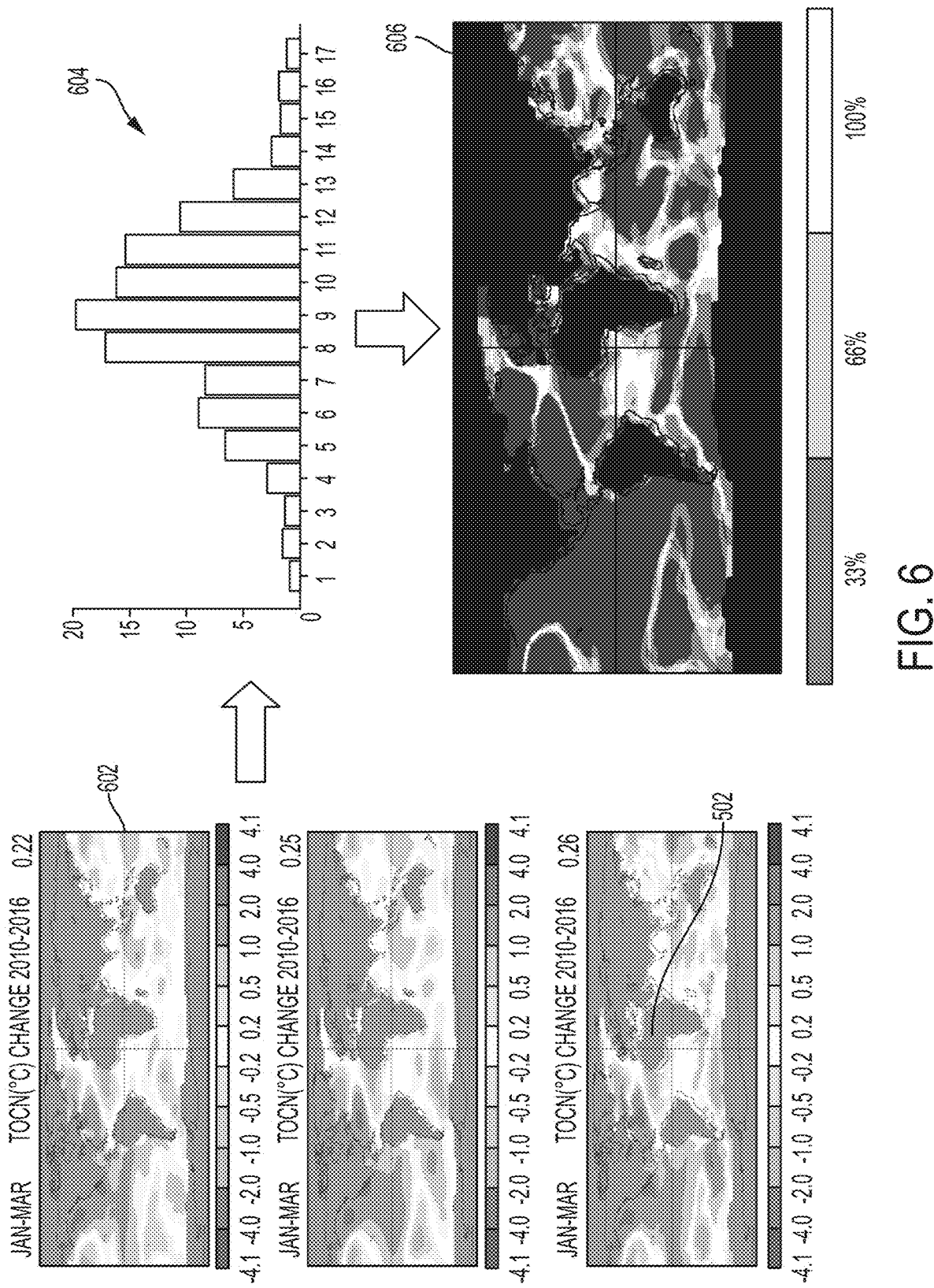
FIG. 6 is a diagram that illustrates example operations of pixel counting and modified color map in one embodiment of the present disclosure.

FIG. 6 is a diagram that illustrates example operations of pixel counting and modified color map in one embodiment of the present disclosure. Based on pixel counting of images at 602, histograms shown at 604 may be generated. A new color map 606 in gray level color scale is created based on the histograms 604.

Figure 7:
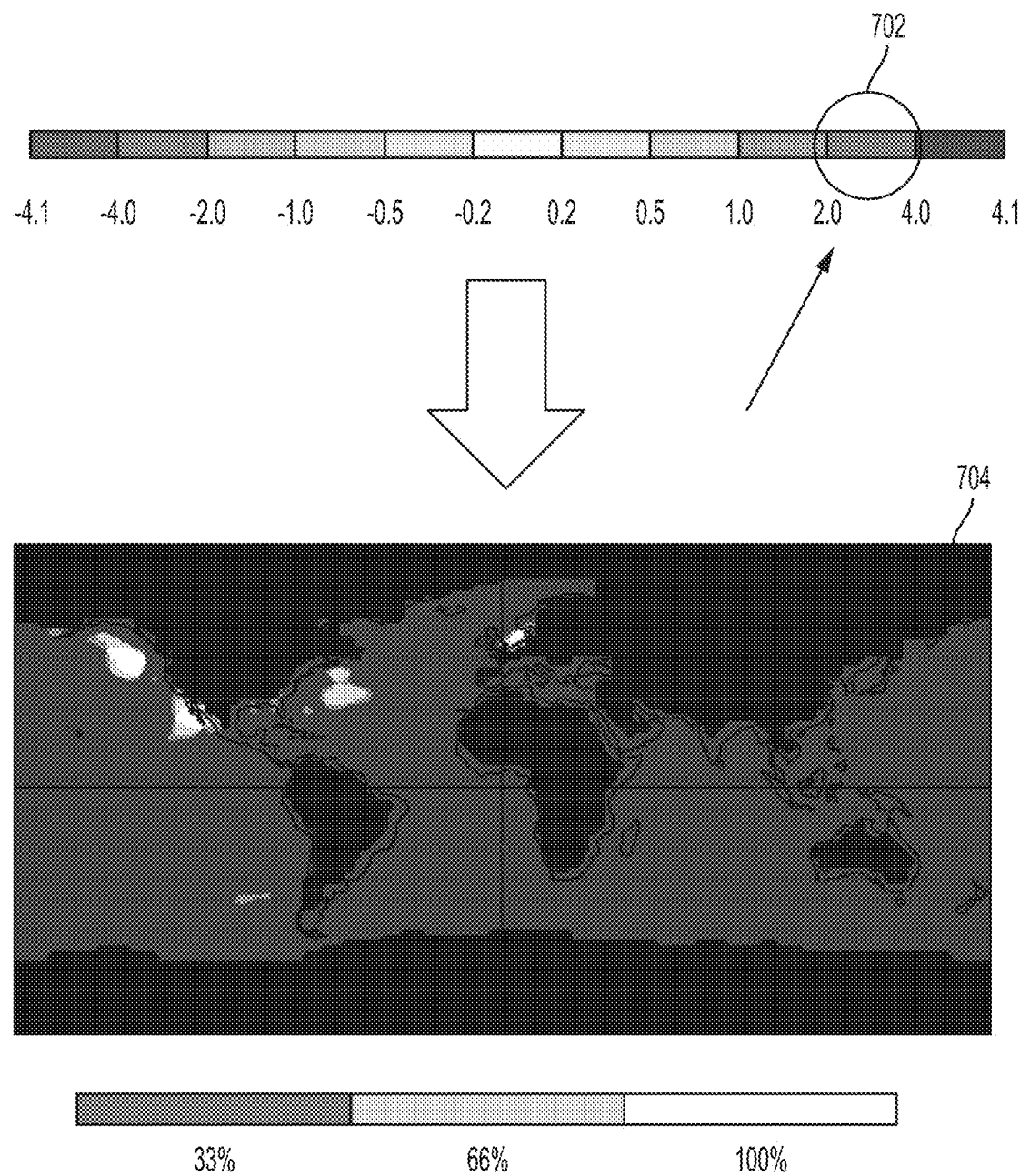
FIG. 7 is a diagram that illustrates a highlight region operation example in one embodiment of the present disclosure.

FIG. 7 is a diagram that illustrates a highlight region operation example in one embodiment of the present disclosure. An interval of values or colors 702 to be observed may be selected from a image of a legend. For instance, a user may be allowed to select the interval of values, via a user interface. The system of the present disclosure may show a new image with those regions highlighted 704.

Figure 8:
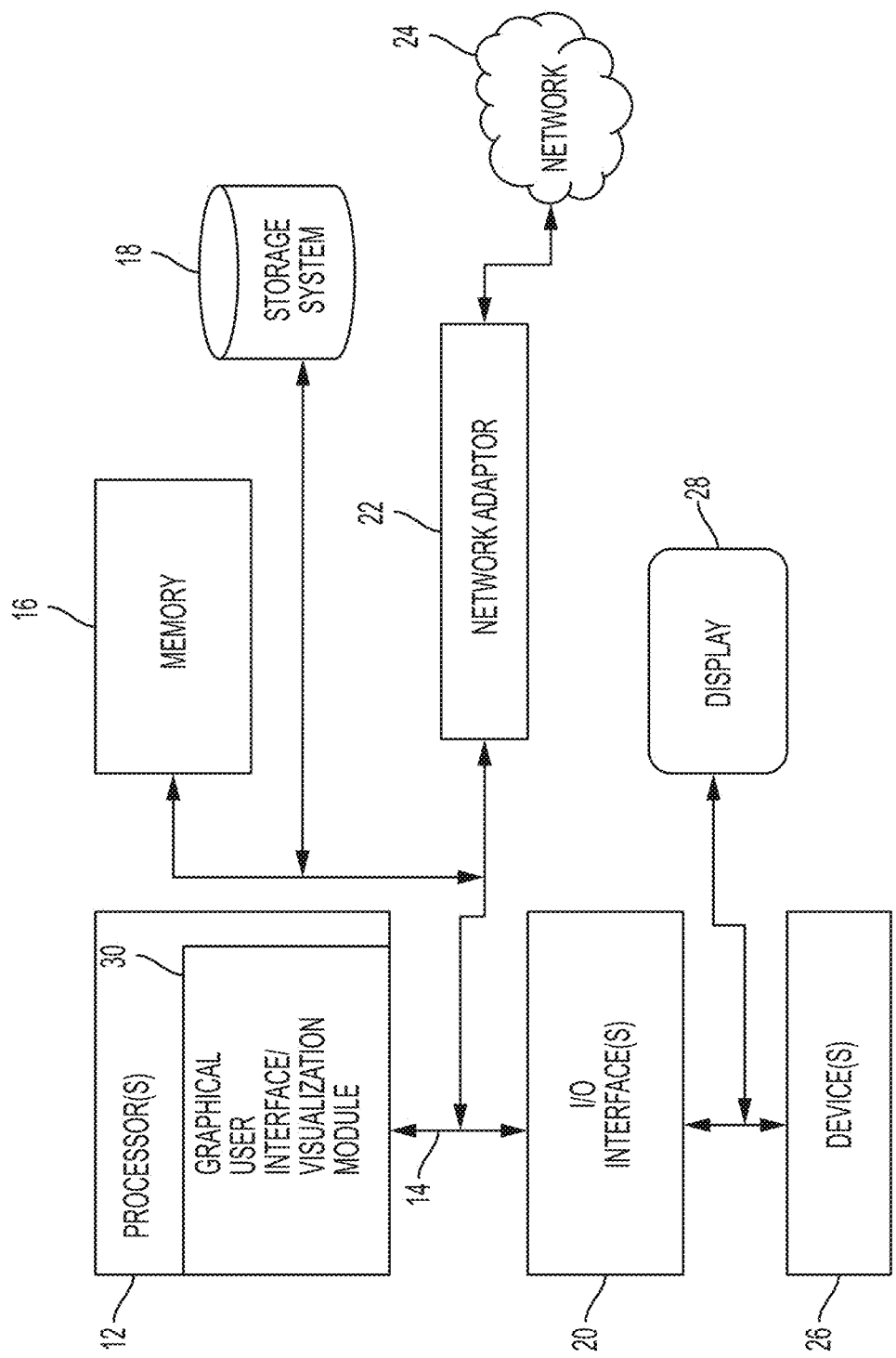
FIG. 8 illustrates a schematic of an example computer or processing system that may implement visualization system in one embodiment of the present disclosure.

FIG. 8 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a visualization module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. An automatic method of determining an image composition procedure that generates a new image visualization based on aggregations and variations of input images, the method executed by a hardware processor, comprising:
   receiving a set of input images;
   extracting visual features from the input images;
   receiving context associated with the input images;
   learning based on the extracted visual features and the context associated with the input images, a composition procedure comprising at least a sequence of set of image operations to apply on the set of input images, the sequence of set of image operations obeying a sequential structure, wherein a previous operation in the sequence creates data for a next operation in the sequence, the sequence of set of image operations including at least a pre-processing operation, a quantification operation, a visualization object creation operation, and an objects visualization operation;
   determining image operations in the composition procedure to present to a user based on the learning; and
   generating a difference visualization image associated with the input images by executing the image operations, the difference visualization image representing an aggregation of the set of input images.

2. The method of claim 1, further comprising:
   monitoring execution of image operations on a training set of images, the image operations generating a difference visualization image associated with the training set of images, wherein multiple executions on multiple sets of images are monitored that generate corresponding multiple difference visualization images; and
   storing in a knowledgebase, the image operations, visual features in the training set of images, and context associated with the training set of images.

3. The method of claim 2, wherein the learning is further based on the knowledgebase.

4. The method of claim 1, further comprising receiving from the user a rating associated with a suggested image operation, and the learning is further based on the rating.

5. The method of claim 4, wherein the rating is used by a reinforcement learning process to improve a reward associated to actions, wherein additional composition procedure comprising a sequence of the actions is presented to the user.

6. The method of claim 1, wherein the context comprises whether the input images are of synthetic objects or natural objects, whether the input images are 2-dimensional or 3-dimensional, image count in the input images, a degree of variability among the input images, a number of colors in the input images, whether a legend is specified in the input images, a domain corresponding to the input images, and an objective in analyzing the input images.

7. The method of claim 1, wherein the step of extracting visual features from the input images comprises executing a Deep Convolutional Activation Feature (DeCAF) extractor to learn visual features from the set of input images.

8. A computer program product comprising a computer readable storage medium having program instructions embodied therewith, the program instructions executable by a device to cause the device to:
   receive a set of input images;
   extract visual features from the input images;
   receive context associated with the input images;
   learn based on the extracted visual features and the context associated with the input images, a composition procedure comprising at least a sequence of set of image operations to apply on the set of input images, the sequence of set of image operations obeying a sequential structure, wherein a previous operation in the sequence creates data for a next operation in the sequence, the sequence of set of image operations including at least a pre-processing operation, a quantification operation, a visualization object creation operation, and an objects visualization operation;
   determine image operations in the composition procedure to present to a user based on the learning; and
   generate a difference visualization image associated with the input images by executing the image operations, the difference visualization image representing an aggregation of the set of input images.

9. The computer program product of claim 8, wherein the device is further caused to:
   monitor execution of image operations on a training set of images, the image operations generating a difference visualization image associated with the training set of images, wherein multiple executions on multiple sets of images are monitored that generate corresponding multiple difference visualization images; and
   store in a knowledgebase, the image operations, visual features in the training set of images, and context associated with the training set of images.

10. The computer program product of claim 9, wherein the learning is further based on the knowledgebase.

11. The computer program product of claim 8, wherein the device is further caused to receive from the user a rating associated with a suggested image operation, and the learning is further based on the rating.

12. The computer program product of claim 11, wherein the rating is used by a reinforcement learning process to improve a reward associated to actions, wherein additional composition procedure comprising a sequence of the actions is presented to the user.

13. The computer program product of claim 8, wherein the context comprises whether the input images are of synthetic objects or natural objects, whether the input images are 2-dimensional or 3-dimensional, image count in the input images, a degree of variability among the input images, a number of colors in the input images, whether a legend is specified in the input images, a domain corresponding to the input images, and an objective in analyzing the input images.

14. The computer program product of claim 8, wherein to extract visual features from the input images, the device is further caused to execute a Deep Convolutional Activation Feature (DeCAF) extractor to learn visual features from the set of input images.

15. An automatic system of determining an image composition procedure that generates a new image visualization based on aggregations and variations of input images, comprising:
   at least one hardware processor;
   a display device couple to the at least one hardware processor;
   the at least one hardware processor operable to receiving a set of input images;
   the at least one hardware processor operable to extract visual features from the input images;
   the at least one hardware processor operable to receive context associated with the input images;
   the at least one hardware processor operable to learn based on the extracted visual features and the context associated with the input images, a composition procedure comprising at least a sequence of set of image operations to apply on the set of input images, the sequence of set of image operations obeying a sequential structure, wherein a previous operation in the sequence creates data for a next operation in the sequence, the sequence of set of image operations including at least a pre-processing operation, a quantification operation, a visualization object creation operation, and an objects visualization operation;
   the at least one hardware processor operable to determine based on the learning, image operations in the composition procedure to present to a user on the display device; and
   the at least one hardware processor operable to generate a difference visualization image associated with the input images by executing the image operations, the difference visualization image representing an aggregation of the set of input images.

16. The system of claim 15, further comprising:
   a knowledgebase coupled to the at least one hardware processor, wherein the at least one hardware processor is further operable to monitor execution of image operations on a training set of images, the image operations generating a difference visualization image associated with the training set of images, wherein multiple executions on multiple sets of images are monitored that generate corresponding multiple difference visualization images, and to store in the knowledgebase, the image operations, visual features in the training set of images, and context associated with the training set of images.

17. The system of claim 16, wherein the at least one hardware processor learns further based on the knowledgebase.

18. The system of claim 15, wherein the at least one hardware processor operable to receive from the user a rating associated with a suggested image operation, and the at least one hardware processor learns further based on the rating.

19. The system of claim 18, wherein the rating is used by a reinforcement learning process to improve a reward associated with actions, wherein additional composition procedure comprising a sequence of the actions is presented to the user.

20. The system of claim 15, wherein the context comprises whether the input images are of synthetic objects or natural objects, whether the input images are 2-dimensional or 3-dimensional, image count in the input images, a degree of variability among the input images, a number of colors in the input images, whether a legend is specified in the input images, a domain corresponding to the input images, and an objective in analyzing the input images.

* * * * *